United States Patent
He et al.

(10) Patent No.: US 6,335,304 B1
(45) Date of Patent: Jan. 1, 2002

(54) METAL SALTS OF PHOSPHORIC ACID ESTERS AS CROSS LINKING CATALYSTS

(75) Inventors: Zhiqiang Alex He, Ridgefield; Werner J. Blank, Wilton; Marie Emmanuelle Picci, Norwalk, all of CT (US)

(73) Assignee: KIng Industries, INC, Norwalk, CT (US)

( * ) Notice: Subject to any disclaimer, the term of this patent is extended or adjusted under 35 U.S.C. 154(b) by 0 days.

(21) Appl. No.: 09/436,827

(22) Filed: Nov. 9, 1999

(51) Int. Cl.⁷ .......................... B01J 31/00; C08F 20/00; C08F 283/00; C08G 65/00
(52) U.S. Cl. .................. 502/162; 502/150; 502/156; 502/159; 502/161; 502/171; 502/172; 525/438; 525/533; 525/534; 525/934; 528/87; 528/88; 528/89; 528/92; 528/220; 528/236; 528/237; 528/242
(58) Field of Search ................... 502/150, 156, 502/159, 161, 162, 171, 172; 525/438, 533, 534, 934; 528/87, 88, 89, 92, 220, 236, 237, 242

(56) References Cited

U.S. PATENT DOCUMENTS

| | | | | |
|---|---|---|---|---|
| 3,281,376 A | * | 10/1966 | Proops | ......................... 528/51 |
| 3,639,345 A | | 2/1972 | Whittemore et al. | |
| 3,847,846 A | * | 11/1974 | Asada | ......................... 522/100 |
| 4,558,076 A | | 12/1985 | Wright et al. | ................ 523/442 |
| 4,614,674 A | | 9/1986 | Lauterbach | ................. 427/386 |

FOREIGN PATENT DOCUMENTS

SA    69/7152    10/1969

OTHER PUBLICATIONS

Anton and Koenig, *J. Polym. Sci.*, Polym Chem. Ed. (1981) 19(2):549–70.
Matejka and Dusek, *Polym. Bull.*, (1986) 15(3):215–21.

* cited by examiner

*Primary Examiner*—Elizabeth D. Wood
(74) *Attorney, Agent, or Firm*—Morgan & Finnegan, LLP

(57) ABSTRACT

A metal (M) alkyl acid phosphate catalyst for the reaction of an epoxy compound with a carboxyl compound to provide a coating formulation that is stable at room temperature; that is humidity resistant, and non-yellowing, wherein the alkyl acid phosphate has the formula:

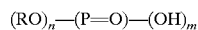

$(RO)_n-(P=O)-(OH)_m$ and wherein:

a. each R is selected from the group consisting of:
  i) a $C_1$ to $C_{18}$ alkly, cycloalkyl, or aryl;
  ii) a linear or branched $C_6$ to $C_{18}$ alkyl substituted with $-(O-CH_2-CH_2-)_o$ or $-(O-CH-CH_3-CH_2-)_p$, wherein o or p is from 1 to 20;
  iii) a β-hydroxyethyl compound, $R'-X-CH_2-CH-OH-CH_2-$, wherein R' is a $C_6$ to $C_{18}$ alkyl or cycloalkyl or aryl, X is either $-CH_2-$, $-O-$ or $-COO-$;
b. n+m=3 and n is between 2 to 1; and
c. M is Zn or Sn (II) in a mole equivalent of 0.7 to 1.5 moles per mole of alkyl acid phosphate.

28 Claims, No Drawings

METAL SALTS OF PHOSPHORIC ACID ESTERS AS CROSS LINKING CATALYSTS

INTRODUCTION

The present invention is directed to a catalyst for the epoxy reaction with carboxyl and or anhydride functional compounds for use in coating, sealant, adhesive and casting applications. More particularly, the present invention is directed to the use of zinc or tin (II) salts of a mono- or di-ester of phosphoric acid (also referred to as alkyl acid phosphate) having the structure:

$$(RO)_n-P(=O)-(OH)_m$$

wherein n+m=3 and n is between 2 to 1 preferably between 1.7 to 1.2 and the metal counter ion Zn or Sn (II) is in a molar equivalent ratio of 0.7 to 1.5 per mole of the alkyl acid phosphate. The use of Zn or Sn(II) alkyl acid phosphate as a catalyst in the epoxy-carboxylanhydride reaction improves the stability of the reactants at room temperature and avoids yellowing or blistering in the coating produced. Furthermore, the improved stability of the reactants in the presence of the catalyst enables a single packaged product for the epoxy-carboxy/ahydride mixture.

BACKGROUND OF THE INVENTION

It has been long recognized that epoxy compounds react with carboxylic acids or with anhydrides. It is also known that this reaction can be catalyzed. Antoon and Koenig (*J. Polym. Sci.*, Polym. Chem. Ed. (1981) 19(2):549–70) studied the mechanism of catalysis by tertiary amines of the reaction of anhydrides with epoxy resins, typically a glycidyl ether of bisphenol. They pointed out that it is the quaternary ammonium salt zwitterion that initiated the polymerization reaction. Matejka and Dusek studied the reaction of phenylglycidyl ether model compounds with caproic acid in the presence of a tertiary amine as the catalyst (*Polym. Bull.* (1986) 15(3):215–21). Based on their experimental data, they suggested that this is an addition esterification process.

Metal salts and amines have been used as catalysts for the epoxycarboxyl/anhydride reaction. For example, 1,8-Diazabicyclo[5.4.0]undec-7-ene (DBU), a strong basic amine and its salts are being promoted as catalysts for epoxy-carboxyl/anhydride polymer systems. It is known that the salts of amines usually improved the pot life of such polymer systems. Whittemore et. al. (U.S. Pat. No. 3,639,345) disclosed thermosetting resins using an epoxy functional bisphenol A and a trimellitic anhydride ester with an amine, an imidazole or an aminoalkyl phenol, as the catalyst.

Metal salts or Lewis acid catalysts are also promoted for epoxy resins. The metal salts has found applications as catalysts for epoxycarboxyl/anhydride coatings. The catalytic effect of metal salts was recognized by Connelly et. al. (ZA 6,907,152) who described the use of zinc acetate, chromium acetate, iron octoate, zinc naphthenate, cobalt naphthenate and manganese naphthenate as catalysts. Metal salts of Mg, Ca, Sr, Ba, Zn, Al, Sn and Sb have been disclosed by Lauterbach (U.S. Pat. No. 4,614,674) as catalysts in combination with waxes as matting agents for powder coatings. Wright et. al. disclose (U.S. Pat. No. 4,558,076) a fast curing coating formulation comprising a carboxyl functional polymer, a tertiary amine, a polyepoxide and an Al, Ti, or Zn alkoxide or complex as the catalyst.

A major problem with the known catalysts is the poor stability of the combination of the epoxy and carboxyl/anhydride reactants at ambient room temperature. The increase in viscosity requires the epoxy and the carboxyl/anhydride compounds to be formulated into two separate packages. A further problem is the yellowing tendency of amines during the bake or heating cycle. In addition, it is known that the use of amines result in films that are sensitive to humidity leading to blistering of the film. It would be desirable to have a catalyst that does not require the separate packaging of epoxy and carboxyl/anhydride reactants and does not cause yellowing or sensitivity to humidity leading to blistering Metal salts such as zinc carboxylates have been shown to be effective catalysts in the above referenced patents. However, the problem with di and polyvalent metal salts is salt formation with the carboxyl groups of the reactant through ionic crosslinking leading to an instant increase in viscosity or gelation. Although covalent bonds are not formed in this process, this reaction can lead to very highly viscous formulations with poor flow quality resulting in poor film properties.

A class of metal alkyl acid phosphates which effectively catalyze the reaction of epoxy-carboxyl/anhydride have been developed. The use of these catalysts in the coating process not only reduce yellowing, but also provided excellent room temperature stability and excellent humidity resistance. The improved stability with the use of the metal alkyl acid phosphates of the invention provides for the formulation of a single packaged product.

SUMMARY OF THE INVENTION

The present invention provides a metal (M) alkyl acid phosphate catalyst wherein the alkyl acid phosphate has the formula:

$$(RO)_n-(P=O)-(OH)_m$$

and wherein:
a. each R is selected from the group consisting of:
   a $C_1$ to $C_{18}$ alkly, cycloalkyl, or aryl;
   a linear or branched $C_6$ to $C_{18}$ alkyl substituted with $-(O-CH_2-CH_2-)_o$ or $-(O-CH-CH_3-CH_2-)_p$, wherein o or p is from 1 to 20; and
   a β-hydroxyethyl compound, R'—X—$CH_2$—CH—OH—$CH_2$—, wherein R' is a $C_6$ to $C_{18}$ alkyl or cycloalkyl or aryl, X is either —$CH_2$—, —O— or —COO—;
b. n+m=3 and n is between 2 to 1; and
c. M is Zn or Sn (II) in a mole equivalent of 0.7 to 1.5 moles per mole of alkyl acid phosphate.

When R is a linear or branched alkyl substituted with $-(O-CH_2-CH_2-)_o$ or $-(O-CH-CH_3-CH_2-)_p$, it may be the reaction product of a $C_6$ to $C_{18}$ alcohol with ethylene oxide or propylene oxide. When R is a β-hydroxyethyl compound, it may be the reaction product of an epoxide with phosphoric acid to provide R'—X—$CH_2$—CH—OH—$CH_2$—, wherein R' is an alkyl or cycloaliphatic or aromatic radical with between $C_6$ to $C_{18}$ carbons, X is —$CH_2$—, —O—, or —COO—. The length of the R or R' chain controls the solubility of the compound in solvents and the compatibility of the compound with other resins.

The catalysts of the present invention are prepared by reacting a zinc or tin (II) alkoxide, oxide or carboxylate with an alkyl or aryl phosphoric acid. The metal alkyl or aryl acid phosphates are useful for catalyzing the reaction between an epoxy compound and a carboxyl compound selected from the group consisting of a carboxylic acid and an anhydride.

LIST OF REFERENCES

1. Antoon and Koenig, *J. Polym. Sci.*, Polym. Chem. Ed. (1981) 19(2):549–70.
2. Matejka and Dusek, *Polym. Bull.* (1986) 15(3):215–21.
3. Wright et. al, U.S. Pat. No. 4,558,076.
4. Whittemore et. al. U.S. Pat. No. 3,639,345.
5. Connelly et. al. ZA 6,907,152.
6. Lauterbach, U.S. Pat. No. 4,614,674.

DETAILED DESCRIPTION OF THE INVENTION

The present invention provides a catalyst, a metal (M) salt of an alkyl acid phosphate with the formula:

$$(RO)_n-(P=O)-(OH)_m$$

wherein:
a. each R is selected from the group consisting of:
   i) a $C_1$ to $C_{18}$ alkyl, cycloalkyl, or aryl;
   ii) a linear or branched $C_6$ to $C_{18}$ alkyl substituted with $-(O-CH_2-CH_2-)_o$ or $-(O-CH-CH_3-CH_2-)_p$, wherein o or p is from 1 to 20; and
   iii) a β-hydroxyethyl compound, $R'-X-CH_2-CH-OH-CH_2-$, wherein R' is a $C_6$ to $C_{18}$ alkyl or cycloalkyl or aryl, and X is either $-CH_2-$, $-O-$ or $-COO-$;
b. n+m=3 and n is between 2 to 1; and
c. M is Zn or Sn (II) in a mole equivalent of 0.7 to 1.5 moles per mole of alkyl acid phosphate.

When R is a linear or branched alkyl substituted with $-(O-CH_2-CH_2-)_o$ or $-(O-CH-CH_3-CH_2-)_p$, it may be the reaction product of a $C_6$ to $C_{18}$ alcohol with ethylene oxide or propylene oxide. When R is a β-hydroxyethyl compound, it may be the reaction product of an epoxide with phosphoric acid to provide $R'-X-CH_2-CH-OH-CH_2-$, wherein R' is an alkyl or cycloaliphatic or aromatic radical with between $C_6$ to $C_{18}$ carbons, X is $-CH_2-$, $-O-$ or $-COO-$. The length of the R or R' chain controls the solubility of the compound in solvents and the compatibility of the compound with other resins.

When R' is an alkyl, cycloalkyl or aryl, it is typically a methyl, ethyl, propyl, isopropyl, n-butyl, isobutyl, dodecyl, hexadecyl, phenyl, nonyl-phenyl, cyclohexyl, or dodecyl-ethenyl-oxy- with 5 to 15 repeating ethylene oxide units.

The RO— groups are typically derived from methanol, ethanol, propanol, isopropanol, b-butanol, isobutanol, dodecanol, hexadecanol, phenol, nonyl phenol, cyclohexanol, dodecanol ethylene oxide reaction products with 5 to 15 repeating ethylene oxide units.

The alkyl phosphorous acids for producing the compounds of the present invention are obtained by reacting any of the above alcohols or phenols with phosphorous pentoxide, either in an solvent or in an excess of the alcohol. This reaction produces a mixture of mono- or di- alkyl or mono- or di- aryl esters of phosphoric acid. Depending on the reaction conditions and whether an excess of alcohol is used the ratio of di- to mono- ester can vary from 4 to 1 (80/20) to 1:4 (20:80). When the ratio of the diester to the monoester is 4:1, n is 1.7. When the ratio of the diester to the monoester is 1:4, n is 1.2. Under practical reaction conditions the ratio is usually 3:2 (60/40). If desired a diester of phosphate can be converted to a mono ester by trans-esterification.

Other suitable reactants with phosphorous pentoxide are compounds with $RO-CH_2-CH-OH-CH_2-O-$, $RCOO-CH_2-CH-OH-CH_2-O$, or $R-CH_2-CH-OH-CH_2-O-$ moieties. These moieties are obtained by reacting an epoxide such as a α-olefin epoxide, a mono glycidyl ether or glycidyl ester with phosphoric acid either in an inert solvent or in bulk.

The catalysts of the present invention are prepared by reacting a zinc or tin (II) alkoxide, oxide or carboxylate with the alkyl and/or aryl acid phosphate obtained as described above. The reaction can be carried out in a solution or also in bulk. The metal alkyl/aryl acid phosphates produced are useful for catalyzing the reaction between an epoxy compound and a carboxyl compound selected from the group consisting of a carboxylic acid and an anhydride.

The epoxy compounds useful in our invention are the polylglycidyl ether of bisphenol A or F or NOVOLAk® phenol formaldehyde resins with a molecular weight of between about 350 to 10000, preferably between 380 and 4000. These resins may be used as solids or viscous liquids. The diglycidyl esters of di and polycarboxylic acids are also useful for the present invention. Other glycidyl functional polymers that are useful include the polymers of the glycidyl ester of methacrylic acid, epoxidized oil, cycloaliphatic epoxies and triglycidyl isocyanurate. Cycloaliphatic epoxy compounds useful for the invention include: 3,4-epoxycyclohexylmethyl 3,4-epoxycyclohexanecarboxylate, spiro[1,3-dioxane-5,3'-[7]oxabicyclo[4.1.0]heptane], 2-(7-oxabicyclo[4.1.0]hept-3-yl), 3,4-epoxycyclohexyl) methyl 3,4-epoxycyclohexylcarboxylate, 1,2-epoxy-4-(epoxyethyl) cyclohexane, 7-Oxabicyclo[4.1.0]heptane-3,4-dicarboxylic acid, bis(oxiranylmethyl) ester, 1,3,5-triglycidyl isocyanurate (TGIC), epoxidized soybean oil, epoxidized linseed oil.

Compounds with carboxyl or anhydride functional groups suitable in the present invention are the mono- di- or poly-carboxyllic acids or anhydrides. Examples of acids and anhydrides suitable for the present invention are: adipic acid; glutaric acid; glutaric anhydride; sebasic acid; 1,10 decanedioic acid; fumaric acid; maleic acid and maleic anhydride; succinic acid; phthalic acid and phthalic anhydride; 8,9,10-trinorborn-5-ene-2,3-dicarboxylic acid and 8,9,10-trinorborn-5-ene-2,3-dicarboxylic anhydride; cyclohexene-1,2-dicarboxylic acid; diphenyl-2,2'-dicarboxylic acid; methylnorbornene-2,3-dicarboxylic anhydride; cyclohexene-1,2-dicarboxylic acid; tetrahydrophthalic anhydride; 5-methyltetrahydrophthalic anhydride; octahydro-4,7-methano-1H-indene-5,-dicarboxylic acid; 1,2-cyclohexanedicarboxylic acid; dimeric fatty acids; alkenyl succinic acids and anhydrides; dicarboxylic acid anhydrides such as: succinic or glutaric anhydride, alkenylsuccinates with an alkenyl group from $C_6$ to $C_{18}$; aromatic anhydrides such as: o-phthalic anhydride, trimellitic acid anhydride or linear anhydrides of diacids.

Also suitable in this invention are carboxyl containing acrylic resins obtained by polymerizing a carboxyl functional monomer such as acrylic, methacrylic, maleic, fumaric, itaconic or the half ester of maleic or fumaric with acrylic or styrene or acrylonitrile monomer. Additionally acrylic polymers with anhydride groups such as the copolymers of acrylic monomers with maleic or itaconic anhydride. Examples for tri carboxylic acids/anhydrides are 1-propene-1,2,3-tricarboxylic acid; 1,2,4-benzenetricarboxylic acid; an adduct of abietic acid with fumaric acid or maleic anhydride; trimellitic anhydride; and citric acid. Examples for monoacids are the $C_{12}$ to $C_{18}$ fatty acids saturated and unsaturated.

Other compounds suitable for the invention as crosslinkers include mono, di or poly glycidyl esters, the reaction products of mono, di and polycarboxylic acids with epichlorohydrine; glycidyl ethers of aliphatic ethers of diols, triols and polyols, such as 1,2,3-propanetriol glycidyl ether; alkyl ($C_{10}$–$C_{16}$) glycidyl ether; lauryl glycidyl ether; glycerin 1,3-diglycidyl ether; ethylene diglycidyl ether; polyethylene glycol bis(glycidyl ether); 1,4-butanediol diglycidyl ether; 1,6-hexanediglycidyl ether; bis(2,3-epoxypropyl) ether; homo and copolymers of allyl glycidyl ether; ethoxylated alcohol($C_{12}$–$C_{14}$) glycidyl ether.

Other than the glycidyl ether of bisphenol A and F and of phenol formaldehyde polymers, phenyl glycidyl ether, p-t-butylphenol glycidyl ether, hydroquinone diglycidyl ether, glycidyl p-glycidyloxybenzoate, p-nonylphenol glycidyl ether, glycidyl ether reaction product of 2-methyl phenol and formaldehyde polymer are also useful in the present invention.

It has to be understood that the use of monofunctional compounds and diluents can reduce the crosslinking density and therefore adversely affect the film properties. Therefore the use of monofunctional compounds has to be balanced with the use of higher functional crosslinkers.

The ratio of the epoxy compound to the carboxyl or anhydride in the formulation can be 0.5 to 1 to 5 to 1 depending on the crosslinking density desired. Normally the optimum crosslinking density is achieved when the ratio of functional epoxy groups and carboxyl groups is one to one under ideal conditions. However, with most epoxy formulations some self-condensation of the epoxy groups takes place. For example, it is necessary to use an excess of epoxy groups to react all the carboxyl or anhydride groups so that a film with no free carboxyl groups are present, if excellent detergent or alkali resistance in a film is desired. However, if better adhesion and flexibility is desired, then the ratio can be adjusted so that some of the unreacted carboxyl groups remain.

The ratio of epoxy to carboxy functional groups is important for primer applications where corrosion resistance is an important requirement. In such a formulation the level of epoxy resin can be reduced. The ratio of epoxy to carboxyl groups is also dependent on the functional groups in the reactant system. For example, if one reacts a carboxyl functional acrylic resin with a difunctional epoxy resin, it might be desirable to use an access of carboxy groups. If an acrylic resin which has a high molecular weight is used, it usually contains many carboxyl groups, a typical acrylic resin might have an acid number of 56 and a molecular weight of 20,000. In such a resin the average chain contains 20 carboxyl groups. To achieve crosslinking in such a system, theoretically three carboxy groups have to be reacted to form an effective network. The epoxy in such a formulation might be a diglycidyl ether of bisphenol A, a difunctional crosslinker. A person with skill in the coating art would therefore use an excess of carboxyl groups and a deficiency of epoxy groups to achieve a good network. Most crosslinking reactions do not go to completion. If the crosslinkers have reacted to an average to 75%, it indicates that some molecules of the crosslinking agents have completely reacted, with some molecules having reacted only at one end and some molecules having not reacted at all. By having an excess of carboxy groups on the acrylic, one could assure a higher conversion of all the epoxy groups. This problem is typical in can coatings, where it is important to eliminate any unreacted epoxy resin to prevent any leaching of epoxy resin into the food.

Typical cure temperatures for the formulations of the present invention are between 100 to 300° C. for a time period from several seconds to hours. Preferred are cure temperatures from 120–250° C. for 30 seconds to 30 minutes.

The formulation of the present invention is useful for producing coatings, adhesive films, or in casting or molding. Typical applications include use as corrosion resistant primers for automotive applications, or can or coil coatings, or automotive clear coats. The coatings can be applied as a high solids or a powder coating.

The following examples illustrates the invention and are not to be used to limit the scope of the invention.

EXAMPLE 1

42.2 parts by weight of a commercially available carboxyl functional polyester resin (Fine Clad M-8841 from Reichhold) with a carboxyl equivalent weight of 1020, was dissolved in 50 parts by weight of n-1-methyl-5-pyrrolidinone and blended with 7.8 parts by weight of a bisphenol A diglycidylether with an epoxy equivalent weight of 188.5.

The formulation was catalyzed with zinc salts at a concentration of 0.25% of Zn based on the total resin solids used. For comparison, a basic amine and a phosphonium were used as catalysts at the recommended concentration of the manufacturer at 0.005 mole % based on resin solids. The formulations were formulated at an epoxy to carboxyl ratio of 1 to 1.

TABLE 1

| Catalyst | MEK (double rubs) | |
|---|---|---|
| | 150° C., 20 minutes | 220° C., 20 minutes |
| No catalyst | 30 | 70 |
| Zinc 2-ethylhexylphosphate salt | 140 | 190 |
| Zinc butyl acid phosphate salt | 125 | 180 |
| Tetrabutylphosphonium Bromide | 135 | 190 |
| 1H-Imidazole, 4,5-dihydro-2-phenyl | 145 | 195 |

TABLE 2

Cure response of Zinc 2-ethylhexylphosphate salt at different temperatures (20 minutes)

| Temperature ° C. | 150 | 160 | 180 | 200 | 220 |
|---|---|---|---|---|---|
| MEK (double rubs) | 130 | 140 | 150 | 165 | 190 |

TABLE 3

Viscosity stability

| Catalyst | Initial cps | One week at 50° C., cps |
|---|---|---|
| No catalyst | 96 | 136 |
| Zinc 2-ethylhexyl acid phosphate salt | 104 | 178 |
| Zinc butyl acid phosphate salt | 100 | 184 |
| Tetrabutylphosphonium bromide | 112 | 550 |
| 1H-Imidazole, 4,5-dihydro-2-phenyl | 100 | 336 |

The above data show the superior stability of a zinc alkylphosphate based catalyst at equal cure response as compared to a phosphonium or an imidazole based catalyst. The data shows that the improved room temperature stability of the catalyst of the present invention is at least twice to three times better than the presently used catalysts.

EXAMPLE 2

20 parts by weight of a commercial available carboxyl functional acrylic resin, Joncryl 819 from Johnson Polymer, was dissolved in 27 parts by weight of xylene and in 27 parts by weight of 2-methoxypropyl acetate. 13 parts by weight of the glycidyl ester functional acrylic polymer glycidyl ester functional acrylic resin with an epoxy equivalent weight of 490 based on resin (acrylic polymer GMA 207-SA from Reichhold) were dissolved in 13 parts by weight of n-butylacetate. The ratio of epoxy to carboxy is 1:1. Both solutions were blended to produce the coating formulation.

Zinc 2-ethylhexyl acid phosphate and 2-ethylimidazole were used to catalyze the reaction. The amount of the zinc and the amine catalysts was adjusted to give identical cure response at 30° C. for 15 minutes. At this temperature a concentration of 0.24% zinc or 0.48% 2-ethylimidazol on total resin solids was required. The cure tests 15 minutes at 140 and 150° C. are shown in the table below.

TABLE 4

Test results

Formulation composition

|  | Zinc 2-ethylhexyl acid phosphate | 2-ethylimidazole | Uncatalyzed |
|---|---|---|---|
| Methylethylketone (2x), bake 140° C., 15 min | 140 | 140 | 60 |
| Methylethylketone (2x), bake 150° C., 15 min | >200 | >200 | 180 |
| Stability at 50° C., gel time, days | 6 | 3.5 | 10 |

EXAMPLE 3

44 parts by weight of a 75.8 wt % xylene/n-butanol solution of a carboxyl functional acrylic resin, equivalent weight 1150, were blended with 17.9 parts by weight of a bisphenol A epoxy resin with an equivalent of 538 and 39.5 parts by weight of 2-methoxypropylacetate and 2 parts by weight of an aromatic 100 solvent. The epoxy to carboxy ratio is 1.25:1. The formulations was drawn down on tin free steel plates at a dry film thickness of 0.15 mil (4 micron) and cured for 6 minutes at 400° F. (204° C.). The amount of catalyst added is wt % based on resin solids. The properties of the film coating formed: its appearance as determined by gloss, its hardness, and its flexibility as determined by T-bend test were determined. The T-bend test was conducted according to ASTM D-4145-83. The panels were also exposed to Cleveland condensing humidity and to a boiling water test. The panels used in the boiling water test were impacted with reverse and direct impact of 80 inch lb before immersed in boiling water.

TABLE 5

| Catalyst | Catalyst, % | Gloss 20°, % | Gloss 60°, % | Pendulum Hardness (sec) | Flexibility T-bend |
|---|---|---|---|---|---|
| No catalyst | 0 | 55 | 95 | 141 | >5T |
| Zinc 2EHAP salt | 0.025 | 95 | 100 | 187 | >5T |
| Zinc 2EHAP salt | 0.05 | 95 | 100 | 194 | 0T |
| Zinc 2EHAP salt | 0.10 | 95 | 100 | 193 | 0T |
| Zinc 2EHAP salt | 0.15 | 95 | 100 | 193 | 0T |

TABLE 5-continued

| Catalyst | Catalyst, % | Gloss 20°, % | Gloss 60°, % | Pendulum Hardness (sec) | Flexibility T-bend |
|---|---|---|---|---|---|
| Zinc 2EHAP salt | 0.20 | 95 | 100 | 203 | 0T |
| 2-Ethyl-imidazole | 0.5 | 95 | 100 | 191 | 0T |
| Amine ADMA-10 | 0.5 | 95 | 100 | 190 | >5T |
| Phosphonium salt ETPPI | 0.5 | 95 | 100 | 187 | 0T |

Zinc 2EHAP is zinc 2-ethylhexyl acid phosphate salt.
ETPPI is ethyltriphenylphosphonium iodide
ADMA-10, decyldimethylamine.

TABLE 6

| Catalyst | Catalyst, % | Cleveland condensing humidity, 45° C., 168 hrs. | | Boiling water test 60 minutes |
|---|---|---|---|---|
| | | Gloss 20°, % | Gloss 60°, % | Appearance after test |
| No catalyst | 0 | * | * | Destroyed* |
| Zinc 2EHAP salt | 0.025 | * | * | Destroyed* |
| Zinc 2EHAP salt | 0.05 | 95 | 100 | No change |
| Zinc 2EHAP salt | 0.10 | 97 | 100 | No change |
| Zinc 2EHAP salt | 0.15 | 95 | 100 | No change |
| Zinc 2EHAP salt | 0.20 | 95 | 100 | No change |
| 2-Ethylimidazole | 0.5 | 98 | 100 | No change |
| Amine ADMA-10 | 0.5 | 43 | 90 | Micro blister |
| Phosphonium salt ETPPI | 0.5 | 90 | 100 | No change |

*Failed Humidity test after 48 hours, low gloss, boiling water test film destroyed The formulations were also tested for stability at room temperature and at 50° C. and the results are shown in Table 7.

TABLE 7

| Catalyst | Catalyst, % | Viscosity, ICI, 25° C., cps, 4 weeks at 25° C. | Viscosity ICI, 25° C., cps, 3 weeks at 50° C. |
|---|---|---|---|
| No catalyst | 0 | 115 | 115 |
| Zinc 2EHAP salt | 0.05 | 1.15 | 250 |
| Zinc 2EHAP salt | 0.10 | 190 | 250 |
| Zinc 2EHAP salt | 0.15 | 190 | 340 |
| Zinc 2EHAP salt | 0.20 | 190 | 370 |
| 2-Ethylimidazole | 0.5 | 470 | gelled after 4.5 days |
| Amine ADMA-10 | 0.5 | 370 | gelled after 8.5 days |
| Phosphonium salt ETPPI | 0.5 | 350 | gelled after 5.5 days |

The above data clearly show the improved combination of stability/cure response and resistance properties of the use of a zinc salt of the present invention as a catalyst.

EXAMPLE 4

86.6 parts by weight of a 75.8 wt % solution in xylene/n-butylacetate of a carboxyl functional acrylic resin with an equivalent weight of 1150 (an experimental resin from Rohm and Haas) is blended with 14 parts by weight of 2-methoxypropyl acetate and 14 parts by weight of an AROMATIC 150 solvent. 28 parts by weight of titanium dioxide, rutile, as a pigment are dispersed in the resin. This pigment paste is let down with 20.3 parts by weight of the above acrylic polymer and with 12.8 parts by weight of a bisphenol A epoxy resin dissolved in 14.3 parts of 2-methoxypropyl acetate. Approximately 0.2 parts by weight of an acrylic flow and leveling agent is added to prevent crater formation. The epoxy to carboxy ratio is 1:1. The film was applied after storage of the formulation for one week at room temperature. The film formulation is applied by drawing down on a tin free steel panel at a dry film thickness of 0.2 mils (5 micron) and cured for 6 minutes at 204° C. The panels were impacted with a direct and reverse impact at 80 inch pound and immersed in boiling water for one hour for the hardness test.

TABLE 8

| Catalyst | Catalyst, % | Gloss 20°, % | Gloss 60°, % | Pendulum Hardness (sec) | T-bend |
|---|---|---|---|---|---|
| No catalyst | 0 | 60 | 76 | 115 | >5T |
| Zinc 2EHAP salt | 0.056 | 65 | 80 | 140 | >5T |
| Zinc 2EHAP salt | 0.085 | 70 | 80 | 132 | 0T |
| Zinc 2EHAP salt | 0.128 | 75 | 90 | 152 | 0T |
| Zinc 2EHAP salt | 0.17 | 83 | 94 | 162 | 0T |
| Zinc 2EHAP salt | 0.20 | 83 | 95 | 163 | 0T |
| 2-Ethylimidazole | 0.85 | 82 | 92 | 152 | 0T |
| Amine ADMA-10 | 0.85 | 78 | 92 | 140 | 4T |
| Phosphonium ETPPI | 0.85 | 85 | 95 | 140 | 0T |

Zinc 2EHAP is zinc 2-ethylhexyl acid phosphate salt. ETPPI is ethyltriphenylphosphonium iodide catalyst, ADMA-10, decyldimethylamine

TABLE 9

| Catalyst | Catalyst, % | Film Appearance after boiling water test |
|---|---|---|
| No catalyst | 0 | Flat gloss, medium dense blister |
| Zinc 2EHAP salt | 0.056 | no change |
| Zinc 2EHAP salt | 0.085 | no change |
| Zinc 2EHAP salt | 0128 | no change |
| Zinc 2EHAP salt | 0.17 | no change |
| Zinc 2EHAP salt | 0.20 | no change |
| 2-Ethylimidazole | 0.85 | no change |
| Amine ADMA-10 | 0.85 | peeling on indirect impact some loss in gloss |
| Phosphonium ETPPI | 0.85 | no change |

The same formulation was applied on cold rolled degreased steel panels at a film thickness of 1.0 mil (25 micron) and cured for 6 minutes at 400° F., (204° C.).

TABLE 10

| Catalyst | Catalyst % | Gloss 20°/60°, % | Pendulum Hardness (sec) | Impact resistance; direct/reverse inch. pound |
|---|---|---|---|---|
| Zinc 2EHAP salt | 0.085 | 90/95 | 129 | 60/<5 |
| Zinc 2EHAP salt | 0.17 | 90/97 | 129 | 110/20 |
| Zinc 2EHAP salt | 0.20 | 91/96 | 130 | 160/130 |
| 2-Ethylimidazole | 0.85 | 90/96 | 140 | 160/160 |
| Amine ADMA-10 | 0.85 | 85/95 | 122 | 60/<5 |
| Phosphonium ETPPI | 0.85 | 78/93 | 130 | 60/<5 |

The same formulation was applied on cold rolled degreased steel panels at a film thickness of 1.0 mil (25 micron) and cured for 6 minutes at 400° F., (204° C.).

TABLE 11

| Catalyst | Catalyst, % | Yellowing Index b value |
|---|---|---|
| Zinc 2EHAP salt | 0.085 | −1.71 |
| Zinc 2EHAP salt | 0.17 | −1.7 |
| Zinc 2EHAP salt | 0.20 | −1.7 |
| 2-Ethylimidazole | 0.85 | 2.26 |
| Amine ADMA-10 | 0.85 | −1.13 |
| Phosphonium ETPPI | 0.85 | −0.185 |

The same formulation was applied on cold rolled degreased steel panels at a film thickness of 1.0 mil (25 micron) and cured for 6 minutes at 400° F., (204° C.) and exposed to salt spray.

TABLE 12

| Catalyst | Catalyst, % | Salt spray ASTM B-117 327 hours, mm creep, blister |
|---|---|---|
| Zinc 2EHAP salt | 0.085–0.2 | 3.0, 10 |
| 2-Ethylimidazole | 0.85 | 4.0–6.0, 10 |
| Amine ADMA-10 | 0.85 | 4.0–4.5, 10 |
| Phosphonium ETPPI | 0.85 | 4.0, 10 |

The above results indicate that the zinc alkylphosphate acid salt is superior in cure response, stability, corrosion resistance and also yellowing.

EXAMPLE 5

A commercially available glycidyl ester functional acrylic resin with an epoxy equivalent weight of 490 based on resin solids was blended with a commercially available carboxyl functional acrylic with a carboxyl equivalent weight of 748 at a ratio of epoxy to carboxy groups of 1/1. 17.84 parts by weight of the glycidyl functional acrylic polymer GMA 207-SA from Reichhold was dissolved in 17.84 parts of n-butylacetate and blended with 27.23 parts by weight of the carboxyl functional polymer Joncryl 819 (Johnson Polymer) dissolved in 37.08 parts of 2-methoxypropylacetate solvent. The catalysts selected were zinc 2-ETAP and Sn (II) 2-ETAP. The concentration of the catalyst used was 0.28 wt % of metal based on the total resin binder. The curing was at 140° C. for 15 min. The Film thickness was 1 mil (25 micron) on untreated steel.

TABLE 13

| Catalyst | MEK resistance | Viscosity Initial, cps | Viscosity 7 days 50° C., cps |
|---|---|---|---|
| Zn EHAP salt | 200 | 310 | 730 |
| Sn(II) EHAP | 200 | 310 | 850 |
| Sn(II) octoate | 97 | 320 | gelled |
| No catalyst | <10 | 300 | 350 |

The catalysts of the present invention, Zn EHAP and Sn(II) EHAP, provided much greater stability to the formulation and improved resistance to wear.

EXAMPLE 6

Zinc 2-ethylhexyl acid phosphate (Zn 2EHAP) was tested as a catalyst in an epoxidized soyabean oil in combination with a carboxyl functional acrylic resin QR, an experimental resin from Rohm and Haas. 76.6 parts by weight of a 75% solution of the carboxy functional acrylic resin with an equivalent weight of 561 was blended with 23.4 parts by weight of a commercially available epoxidized soyaoil, VITROFLEX 7071 (Elf Atochem) with an equivalent weight of 228. The epoxy to carboxy ratio is 2/1. The formulation was catalyzed with 1% of zinc 2EHAP and with 2-ethylimidazole. The coating was applied on B1000 iron phosphate pretreated steel panels at a dry film thickness of 1.0 mil (25 micron) and cured for 20 minutes at 160° C.

TABLE 14

|  | Zn-2EHAP salt | 2-ethylimidazole | No catalyst |
|---|---|---|---|
| Gloss 20°/60°, % | 100/100 | 100/100 | 100/100 |
| Methylethylketone double rubs | 40 | 20 | 5 |
| Pendulum hardness (sec) | 38 | 24 | 27 |

EXAMPLE 7

24.9 parts by weight of a 50% solution of trimellitic anhydride in 50 acetone was blended with 74.4 parts by weight of an epoxidized soyaoil, VITROFLEX 7071 (Elf Atochem), with an epoxy equivalent weight of 228. The formulation was catalyzed with 1.5 wt % of catalyst based on the resin weight. The formulation had a non-volatile content of 83% and a viscosity of 900 cps. The epoxy to anhydride molar ratio was 5.6 to 1. The coating was applied on iron phosphated cold rolled steel panels at a dry film thickness of 1.0 mil (25 micron) and cured for 20 minutes at 140° C.

TABLE 15

|  | Zn 2EHAP salt | 2-ethylimidazole | No catalyst |
|---|---|---|---|
| Gloss 20°/60°, % | 100/100 | 100/100 | 100/100 |
| Pencil Hardness | HB | 2B | 4B |
| Direct Impact resistance, inch. lb | 100 | 5 | 0 |

EXAMPLE 8

Zinc 2-EHAP was tested as a catalyst in an epoxy casting with an anhydride as a crosslinker. 100 parts by weight of a liquid bisphenol A diglycidyl ether with an epoxy equivalent weight of 188.5 was blended with 80 parts by weight of methyl tetrahydrophthalic anhydride. The formulation was catalyzed with 0.5% by weight of Zinc 2-EHAP and 2-ethylimidazole respectively. The film was cured for 1 hour at 80° C., then 3 hours at 150° C. The zinc 2EHAP salt catalyzed formulation shows essentially no yellowing under these cure conditions.

TABLE 16

|  | Zn 2EHAP | 2-ethylimidazole | Uncatalyzed |
|---|---|---|---|
| Original viscosity, cps, 25° C. | 900 | 900 | 900 |
| Viscosity after 24 hours, cps, 25° C. | 900 | 4,200 | 900 |
| Potlife, 25° C., days | >2 weeks | 3 days | >2 weeks |
| Cure cycle: 1 hour at 80° C. then 3 hours at 150° C. |  |  |  |
| Shore D Hardness | 95 | 95 | liquid |

TABLE 16-continued

|  | Zn 2EHAP | 2-ethylimidazole | Uncatalyzed |
|---|---|---|---|
| Yellowing of casting at the cure temperature |  |  |  |
| L |  | 80.53 | 70.49 |
| b* |  | 17.96 | 73.92 |
| a* |  | −6.62 | 11.65 |

In the above table, L, b*, a* are color coordinates in the CIE color space: L=lightness, b*=blue/yellow factor or yellowness, a*=red/green factor. A high L value indicates a brighter color, a positive b* value indicates more yellowness, and a positive a* value indicates more red, a negative value, more green. The data obtained indicate that the coating containing 2-ethylimidazole catalyst was very yellow (low L and high b* and a* values). The coating containing the zinc 2-EHAP as a catalyst was white with a bluish tint (high L, low b* and negative a*).

EXAMPLE 9

Comparative Examples with Amine Catalysts

A commercially available glycidyl ester functional acrylic resin with an epoxy equivalent weight of 490 based on resin solids was blended with a commercially available carboxyl functional acrylic with a carboxyl equivalent weight of 748 at a ratio of epoxy to carboxy groups of 1:1. 17.84 parts weight of the glycidyl functional acrylic polymer GMA 207-SA from Reichhold was dissolved in 17.84 parts of n-butylacetate and blended with 27.23 parts by weight of the carboxyl functional polymer Joncryl 819 (Johnson Polymer) dissolved in 37.08 parts of 2-methoxypropylacetate solvent. This formulation was catalyzed with various commercially available amine catalysts at a catalyst concentration of 0.005 mol % on the total resin solids.

The coating was drawn down on iron phosphate pretreated steel panels at a dry film thickness of 1 mil (25 micron). For comparison the formulation was also applied in uncatalyzed form onto the steel panels. The uncatalyzed formulation required a cure temperature of 170° C. for 15 minutes to achieve >200 methylethylketone (MEK) double rubs. Because of the hardness of the polymer and the molecular weight both impact resistance and hardness did not vary for this formulation if the coating was bake between 140 to 175° C. At the bake temperature of 140° C. the uncatalyzed formulation gave a MEK resistance of 45 double rubs. The viscosity of the uncatalyzed formulation was 298 cps at 25° C.

TABLE 17

| Catalyst | MEK 140° C. 15 min. | MEK 110° C. 15 min | Viscosity 0 hours cps | Viscosity 7 weeks cps | Film Appearance |
|---|---|---|---|---|---|
| No catalyst (control) | 40 | 10 | 298 | 340 | clear |
| Benzyltrimethyl ammonium bromide | >200 | 34 | 116 | gelled | clear |
| Benzyltrimethyl ammonium hydroxide | >200 | 20 | 320 | gelled | clear |
| Tetrabutyl ammonium hydroxide | >200 | 19 | 320 | gelled | clear |

TABLE 17-continued

| Catalyst | MEK 140° C. 15 min. | MEK 110° C. 15 min | Viscosity 0 hours cps | Viscosity 7 weeks cps | Film Appearance |
|---|---|---|---|---|---|
| n,n-Dimethyl-benzylamine | 142 | 6 | 344 | gelled | clear |
| 2-ethylimidazole | 140 | 16 | 308 | gelled | clear |
| 1-butylimidazole | 165 | 17 | 308 | gelled | clear |
| 1,5-Diazabicyclo [5.4.0] undec-5-ene (DBU) | >200 | 17 | 400 | gelled | clear |
| 1,5-diazobicyclo [4.3.0] non-5-ene (DBN) | 200 | 10 | 370 | gelled | Clear yellow |
| DBU/Octanoic acid | 179 | 5 | 318 | gelled | clear |
| Tetramethyl guanidine | 175 | 6 | 405 | gelled | clear |
| n,n,n',n'-Tetramethyl-1,8-diaminonaphthalene | 52 | 5 | 350 | gelled | clear |
| Anchor 1170 (Air Products) | 15 | 4 | 320 | gelled | Clear yellow |
| 2-ethylhexylamine | 34 | — | 418 | 770 | clear |
| Bis(2-ethylhexyl)amine | 41 | — | 400 | 480 | clear |
| Dodecyldimethylamine | 105 | 12 | 360 | gelled | clear |
| Tetrabutyl phosphonium bromide | 40 | — | 280 | 360 | clear |

As shown in the above table none of the amine or basic catalysts were able to provide a satisfactory combination of acceptable room temperature stability a cure response at 140° C. Products which provides room temperature stability such as tetrabutyl phosphonium bromide gave poor cure response at 140° C. It is to be noted that some of the formulations were overbaked at 180° C. for 20 minutes and the yellowing index was measured. The formulations were also baked at 140° C. for 15 minutes and exposed to Cleveland condensing humidity for 21 and 35 days. The 20° gloss was measured before start of the humidity test and after the exposure. A loss of gloss indicates blistering or haze formation of the film.

TABLE 18

| Catalyst | Yellowing Index 180° C. 20 min | Humidity Resistance Cleveland Condensing Gloss 20° | | |
|---|---|---|---|---|
| | | 0 days | 21 days | 35 days |
| No catalyst | 0.2 | 87.1 | 87.1 | 87.1 |
| Benzyl trimethyl ammonium bromide | 2.14 | 94.1 | 79.2 | 75.4 |
| Benzyl trimethyl ammonium hydroxide | 2.64 | 91.1 | 78.0 | 83.1 |
| Tetrabutyl ammonium hydroxide | 1.12 | 87.1 | 82.5 | 75.6 |
| N,N-Dimethylbenzylamine | 2.77 | 89.7 | 86.6 | 86.6 |
| 2-ethylimidazole | 2.79 | 91 | 86.3 | 81.6 |
| 1-butyl imidazole | 4.11 | 93 | 87.2 | 80.1 |
| DBU | 2.27 | 88.8 | 90.7 | 88.1 |
| DBN | 3.18 | 88.1 | 83.5 | 79.3 |
| DBU/Octanoic acid (2-ethylhexanoic acid) 1:1 | 1.64 | 90.7 | 91.1 | 88.4 |
| Tetramethyl guanidine | 1.27 | 86.6 | 86.5 | 85.3 |

As shown in this table only the uncatalyzed formulation and the DBU, tetra methyl guanidine and n, n-dimethylbenzylamine catalysts provided films with acceptable humidity resistance. Yellowing is only acceptable for the tetramethyl guanidine, tetrabutyl ammonium hydroxide and the uncatalyzed formulation. A combination of the results of the cure and stability study with the humidity and yellowing test show that none of the amine catalysts provided acceptable films.

EXAMPLE 10

Comparative Examples with Metal Catalysts

Metal catalysts were tested in the resin formulation used in Example 1. Each of the metal catalysts were compared on a metal concentration of 0.28% of metal based on the resin solids and the epoxy to carboxy ratio was 1:1.

TABLE 19

| Catalyst | MEK 140° C. 15 min | Viscosity 0 hrs, cps | Viscosity 6 wks, cps | Film Appearance |
|---|---|---|---|---|
| No Catalyst (control) | 40 | 298 | 320 | clear |
| Zirconium Octoate | — | gelled | — | — |
| Zirconium 6-methylhexanedione | 138 | 295 | 590 | clear |
| Zirconium(IV)trifluoro-acetylacetone | 72 | 120 | 145 | clear |
| Zinc Octoate | 95 | 325 | 540 | clear |
| Zinc Octoate/DDBSA | 54 | Gelled | — | Bubbles |
| Zinc Nitrate 409-48 | 84 | 290 | 680 | clear |
| Zinc Salicylate | 188 | 160 | 230 | clear |
| Zinc di-2-ethylhexyldithio-phosphate | 35 | 280 | Gelled | clear |
| Zinc acetate | >200 | 210 | Gelled | clear |
| Zinc Acetylacetonate | 197 | 270 | 570 | clear |
| Tyzor DC (Ti ethyl acetoacetate chelate) | 50 | 340 | Gelled | Yellow crystals |
| Tyzor GBA (Ti Acetylacetonate chelate) | 72 | 300 | Gelled | Yellow crystals |
| Tyzor TE (Ti triethanolamine chelate)* | — | Gelled | — | — |
| Stannous Octoate | 97 | 310 | 730 | clear |
| Dibutyltin dilaurate | 35 | 310 | 450 | clear |
| Nickel acetylacetonate | 51 | 170 | 170 | clear faint green tint |
| Manganese naphthenate | 69 | 360 | 590 | clear amber |
| Magnesium dinonylnaph-thalene sulfonic acid | 42 | 300 | 420 | bubbles, clear yellow |
| Magnesium 2,4-Pentadionate | 87 | 95 | 270 | clear |
| Iron(III)acetylacetonate | 54 | 150 | 180 | deep red/yellow sol'n |
| Copper(II)acetylacetonate | 48 | 120 | 155 | clear blue |
| Cobalt Octoate | — | Gelled | — | purple crystals |
| Chromium(III)2-ethylhexanoate | — | Gelled | — | clear green |
| Cerium Naphthenate | 50 | 270 | 540 | clear |
| Calcium Octoate | 53 | 285 | 580 | cloudy |
| Bismuth Octoate | 52 | 310 | 408 | clear |
| Aluminum acetylacetonate | 49 | 140 | 170 | clear |
| Aluminum lactate | 34 | 110 | 155 | cloudy |
| Zinc salt of dodecenyl succinate butyl half ester | 149 | 360 | 800 | Clear |

From the many metal salts screened only some of the zinc and tin (II) salts showed any promise as a catalyst. However, the zinc and tin salts of the prior art resulted in either an immediate increase in viscosity or gelation. This rapid increase in viscosity is believed to result from an ionic crosslinking reaction with the carboxyl groups of the polymer leading to salt formation. Some increase in viscosity is acceptable during the stability test.

TABLE 20

| Metal Salt Catalyst | Yellowing Index 180° C. 20 min | Humidity Resistance Cleveland Condensing Gloss 20° 0 days | | QUV Resistance 20° gloss 16 days |
| --- | --- | --- | --- | --- |
| | | | 21 days | |
| No Catalyst | 0.2 | 87.1 | 87.1 | 87.1 |
| Zinc Octoate | 2.35 | 87.4 | 87.2 | 83.6 |
| Zinc Nitrate | 4.57 | 90.9 | 65.4 | 82.0 |
| Zinc Salicylate | 1.77 | 89.9 | 89.3 | 89.2 |
| Zinc acetate dihydrate | 1.41 | 89.2 | 83.6 | 84.3 |
| Zinc acetylacetonate | 1.82 | 88.1 | 92.7 | 86.2 |
| Stannous Octoate | 1.63 | 86.7 | 88.5 | 81.0 |
| Magnesium 2,4-Pentadionate | 1.9 | 84.9 | 82.1 | 74.5 |

With the exception of zinc nitrate and octoate, most of the metal salt catalysts showed less than 2 yellowing index. The humidity resistance with the exception of zinc acetate and nitrate was good for the metal salt catalysts.

EXAMPLE 11

Further Comparative Examples with Metal Catalysts

The formulation of Example 9 was used for the evaluation of a number of the zinc salts. To illustrate the effect of ionic interaction of the zinc salts with the carboxyl groups and to exclude any crosslinking with the epoxy resin a formulation containing only the carboxyl functional acrylic and no epoxy resin was prepared. The formulations were catalyzed with 0.28 wt % zinc on a resin basis.

As seen in the column "Viscosity, cps, Carboxyl Acrylic", the viscosity of the solution immediately increases in comparison to a uncatalyzed formulation. Further, each of the formulations containing the zinc carboxylates resulted in a hazy film, with some precipitation and gelation. However, despite the poor appearance the use of some of the zinc salts as catalysts provided cured films.

TABLE 21

| Catalysts | Formulation Appearance | Viscosity, cps Carboxyl Acrylic | Viscosity, cps Formulation | Solvent resistan MEK double rub |
| --- | --- | --- | --- | --- |
| No catalyst | Clear | 540 | 360 | 75 |
| Zinc octoate | Clear-solubilized agglomerations | 800 | 500 (agglomerations) | 175 |
| Zinc dibutyl dithiocarbamate | Hazy | 560 | 470 | 90 |
| Zinc lactate | fine dispersion settling | 600 | 480 | 100 |
| Zinc succinate | white dispersion settling | 760 | 480 | 100 |
| Zinc glycinate | white dispersion settling | 840 | 550 | 150 |
| Zinc gluconate | large particles settling | 760 | 560 | 90 |
| Zinc oleoyl-sarcosinoate | Orange-homogenous | 840 | 500 | 110 |
| Zinc acetate | Small clear particles | 800 | 500 | 200 |
| Zinc salicylate | Clear | 680 | 470 | 200 |
| Zinc isovalerate | Clear | 1080 | 600 | 200 |
| Zinc laurate | Small clear particles | 1200 | 500 | 200 |

As shown in the above table a number of the zinc salts provided good cure responses. Only zinc salicylate provided both a good cure response and a clear solution with a minimum increase in viscosity. However, the films with zinc salicylate showed substantial yellowing and discoloration. It was also found that with zinc salicylate, a pink discoloration was sometimes found on the steel panels indicating the formation of a pink complex between iron and salicylic acid.

EXAMPLE 12

Comparative Examples with Metal Catalysts

To further elucidate the effect of the zinc counterion on solubility and interaction with the carboxyl groups of the acrylic resin a number of zinc salts of different acids were prepared. Each test solution was prepared with a commercially available acrylic resin QR (Rohm and Haas) with a carboxyl equivalent weight of 748. 50 parts by weight of this resin were dissolved in 50 parts by weight of 2-methoxypropyl acetate and the catalyst was dissolved in 3.5 parts by weight of methanol. A concentration corresponding to 0.4% of zinc catalyst based on the weight of the acrylic polymer was used. The viscosity of the blend was immediately measured.

TABLE 22

| Acid | Viscosity, cps Initial | Viscosity, cps 1 week, 50° C. |
| --- | --- | --- |
| Octanoic no Zn added (control) | 880 | 880 |
| Acetic | 1480 | 1400 |
| Dichloro acetic acid | 1160 | |
| Isobutyric acid | 1440 | |
| Isovaleric acid | 1400 | |
| Octanoic acid | 1440 | 1480 |
| Stearate acid | | 1480 |
| Maleic isobutyl half ester | 1480 | 1500 |
| Benzoic acid | 1240 | 1440 |
| 1-Naphtylacetic acid | 1440 | 1440 |
| Benzilic acid | 1120 white suspension | 1120 white suspension |
| 2-(4-Chlorobenzoyl)benzoic acid | 1520 yellow | 1520 yellow |
| 2-(p-Toluoyl)benzoic acid | 1520 | 1520 |
| Oxalic acid | 1240 | 1040 haze |
| Methyl succinic acid | 1220, precipitate | 1400, precipitate |
| Ethylmalonic acid | 1520 | |
| Fumaric acid | not sol. | |
| o-Phthalic acid | Precipitate, gel | |
| Glycolic acid | Hazy precipitate | 1160, hazy precip. |
| Lactic acid | 1120 | 1120, slight haze |
| 2-hydroxyisobutyric acid | 1120 | 1040, slight haze |
| 2-hydroxycaproic acid | 1080 | 1080 hazy precipit. |
| Citric acid | 1000 | 1000, hazy precip. |
| Dimethylolpropionic acid | not sol. | |
| o-Hydroxybenzoic acid | 1240 | 1200 |
| 3-Hydroxy 2-naphtoic acid | 1360 yellow | 1360 yellow |
| Mandelic acid | Gel | |
| N-Methylglycine (sarcosine) | Not sol. | |
| Aspartic acid | Not sol. | |
| Acrylamidoglycolic acid | Not sol., yellow | |
| Mercaptobenzothiazol | Precipitate, gel | |
| Diisobutyldithiocarbamate | 920, slight haze | 880, slight haze |
| 2-Ethylhexyl acid phosphate* | 960 | 960 |
| Phenyl acid phosphate | 960 slight haze | 960 slight haze |

*mixture of mono and di 2-ethylhexyl phosphate 1 to 2. (2EHAP)

The data in Table 21 shows that the zinc 2-ethylhexyl acid phosphate was the only catalyst which provided low viscosity and clear solutions. Whereas, phenyl acid phosphate is borderline in solubility, and all of the other acids resulted in either precipitation or higher viscosity. The zinc salt of diiso-butyl-dithiocarbamate resulted in a yellow solution and discoloration during baking.

The results obtained showed that the metal catalysts of the present invention provided a combination of improved film properties that are desirable. The Examples provided above are for the purposes of illustration and are not to be construed as to limit the scope of the invention.

We claim:

1. A composition comprising a blend of;
   A. an epoxy functional compound selected from the group consisting of polyglycidyl ethers, glycidyl ether of phenol formaldehyde polymers with a molecular weight of between 350 to 10000; diglycidyl esters of polycarboxylic acids, diglycidyl esters of methacrylic acid; epoxidized oils, cycloaliphatic epoxy compounds and triglycidyl isocyanurate;
   B. a carboxy functional compound selected from the group consisting of a di- or polycarboxylic acid, an acrylate, a polyester, a di- or poly-anhydride and an acrylic anhydride; and
   C. a metal (M) salt of an alkyl acid phosphate wherein the alkyl acid phosphate is: $(RO)_n-(P=O)-(OH)_m$, and wherein:
      a. each R is selected from the group consisting of:
         i) a $C_1$ to $C_{18}$ alkyl, cycloalkyl, or aryl;
         ii) a linear or branched $C_6$ to $C_{18}$ alkyl substituted with $-(O-CH_2-CH_2-)_o$ or $-(O-CH-CH_3-CH_2-)_p$, wherein o or p is from 1 to 20; and
         iii) a β-hydroxyethyl moiety, $R'-X-CH_2-CH-OH-CH_2-$, wherein R' is a $C_6$ to $C_{18}$ alkyl or cycloalkyl or aryl, X is either $-CH_2-$, $-O-$ or $-COO-$;
      b. n+m=3 and n is between 2 to 1; and
      c. M is Zn or Sn (II) in a mole equivalent of 0.7 to 1.5 moles per mole of alkyl acid phosphate.

2. A composition according to claim 1 wherein R is a linear or branched alkyl substituted with $-(O-CH_2-CH_2-)_o$ or $-(O-CH-CH_3-CH_2-)_p$, wherein o or p is from 1 to 20.

3. A composition according to claim 1 wherein R is a β-hydroxyethyl, $R'-X-CH_2-CH-OH-CH_2-$, wherein R' is a $C_6$ to $C_{18}$ alkyl or cycloalkyl or aryl, X is either $-CH_2-$, $-O-$, or $-COO-$.

4. A composition according to claim 1 wherein M is Zn.

5. A composition according to claim 1 wherein M is Zn and R is ethylhexyl acid phosphate.

6. A composition according to claim 1 wherein M is Sn(II).

7. A composition according to claim 1 wherein M is Sn(II) and R is ethylhexyl acid phosphate.

8. A composition according to claim 1, 5 or 7 wherein the epoxy functional compound is selected from the group consisting of di- or poly-glycidyl ether of bisphenyl A or F; poly glycidyl ether of bisphenyl A or F.

9. A composition according to claim 1, 5, or 7 wherein the epoxy compound is selected from the group consisting of a poly glycidyl ester of di- or poly- carboxylic acid and a polyacrylate.

10. A composition according to claim 8 wherein the carboxy compound is a $C_6$–$C_{36}$ aliphatic or aromatic di- or poly-carboxylic acid.

11. A composition according to claim 9 wherein the carboxy compound is a $C_6$–$C_{36}$ aliphatic or aromatic di- or poly-carboxylic acid.

12. A composition according to claim 8 wherein the carboxy compound is an acrylate or a polyester.

13. A composition according to claim 9 wherein the carboxy compound is an acrylate or a polyester.

14. A composition according to claim 8 wherein the carboxy compound is a di-anhydride or an acrylic anhydride.

15. A composition according to claim 9 wherein the carboxy compound is a di-anhydride or an acrylic anhydride.

16. A composition according to claim 8 in liquid form.

17. A composition according to claim 9 in liquid form.

18. A composition according claim 8 in a solid powder form.

19. A composition according claim 9 in a solid powder form.

20. A composition according to claim 16 wherein the epoxy compound is a glycidyl ether of bisphenyl A.

21. A composition according to claim 17 wherein the epoxy compound is a glycidyl ether of bisphenyl A.

22. A composition according to claim 18 wherein the epoxy compound is a glycidyl ether of bisphenyl A.

23. A composition according to claim 19 wherein the epoxy compound is a glycidyl ether of bisphenyl A.

24. A composition according to claim 16 wherein the epoxy compound is a glycidyl ether of bisphenyl F.

25. A composition according to claim 17 wherein the epoxy compound is a glycidyl ether of bisphenyl F.

26. A composition according to claim 18 wherein the epoxy compound is a glycidyl ether of bisphenyl F.

27. A composition according to claim 19 wherein the epoxy compound is a glycidyl ether of bisphenyl F.

28. A composition according to claim 1, 5 or 7 wherein the epoxy compound is a glycidyl ester of an acrylic polymer selected from the group consisting of copolymers of styrene and acrylic and methacrylic esters and copolymers of glycidyl acrylate and glycidylmethacrylate.

* * * * *

UNITED STATES PATENT AND TRADEMARK OFFICE
CERTIFICATE OF CORRECTION

PATENT NO.    : 6,335,304 B1         Page 1 of 1
DATED         : January 1, 2002
INVENTOR(S)   : Zhiqiang Alex He, Werner J. Blank and Marie Emmanuelle Picci It is certified that error appears in the above-identified patent and that said Letters Patent is hereby corrected as shown below:

Title page,
Item [73] Assignee, change "KIng Industries, INC." to -- King Industries, Inc. --.

Column 4,
Line 34, correct "carboxyllic acid" to -- carboxylic acid --.

Column 7,
Line 13, correct "30°C" to -- 130°C --.

Signed and Sealed this

Twenty-first Day of May, 2002

Attest:

Attesting Officer

JAMES E. ROGAN
*Director of the United States Patent and Trademark Office*